United States Patent [19]
Taylor

[11] Patent Number: 5,938,309
[45] Date of Patent: Aug. 17, 1999

[54] BIT-RATE TRANSPARENT WDM OPTICAL COMMUNICATION SYSTEM WITH REMODULATORS

[75] Inventor: Michael G. Taylor, Laurel, Md.

[73] Assignee: CIENA Corporation, Linthicum, Md.

[21] Appl. No.: 08/820,670

[22] Filed: Mar. 18, 1997

[51] Int. Cl.⁶ ................................................... H04J 14/02
[52] U.S. Cl. .......................... 357/124; 359/176; 359/179; 375/214
[58] Field of Search ..................................... 359/124, 125, 359/133, 135, 161, 173, 174, 176, 179; 375/211, 214, 215

[56] References Cited

U.S. PATENT DOCUMENTS

| | | | |
|---|---|---|---|
| 5,351,147 | 9/1994 | Frenkel | 359/124 |
| 5,483,372 | 1/1996 | Green, Jr. | 359/173 |
| 5,504,609 | 4/1996 | Alexander et al. | 359/125 |
| 5,557,439 | 9/1996 | Alexander et al. | 359/130 |
| 5,581,566 | 12/1996 | St. John et al. | 371/37.6 |
| 5,589,969 | 12/1996 | Taga et al. | 359/124 |

OTHER PUBLICATIONS

Kazi, K.; "Elimination of Clock Recovery and Framing by Transporting Clock, Data and Synchronization Pulse for OC–192 Using WDM;" Nov. 1995; Journal of Lightwve Technology, vol. 13, No. 11, pp. 2136–2141.

Nakagawa et al.; "Development of Sonet 2.4 Gbps 4–Fiber Ring Network System;" Oct. 1995; NEC Research & Development, vol. 36, No.4; pp. 535–544.

PCT International Search Report for International Application No. PCT/US98/04871; 4 pages.

*Primary Examiner*—Rafael Bacares
*Attorney, Agent, or Firm*—Margaret Burke

[57] ABSTRACT

The present invention provides improved compatibility between optical transmitters of various data rates and WDM optical communication systems. In the present invention, optical remodulators are configured to receive an optical signal, separate the information from that optical signal into N information streams (where N is a whole number greater than or equal to 2), and place the information onto N optical channels within the channel plan of a WDM optical system. Alternatively, the present invention provides optical remodulators configured to receive N optical signals, combine the information from the N optical signals, and place the information onto a single output optical channel having a wavelength within the channel plan of a WDM optical system.

13 Claims, 4 Drawing Sheets

FIG. 4

BIT-RATE TRANSPARENT WDM OPTICAL COMMUNICATION SYSTEM WITH REMODULATORS

FIELD OF THE INVENTION

The invention relates to optical communication systems generally and, more particularly, to optical communication systems with remodulators which carry plural optical signals of different wavelengths simultaneously, the optical signals being generated by a variety of optical transmitters having various data rates.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, NY) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. In a WDM system, plural optical signal channels are carried over a single waveguide, each channel being assigned a particular wavelength. Through the use of optical amplifiers, such as doped fiber amplifiers, plural optical channels are directly amplified simultaneously, facilitating the use of WDM systems in long-distance optical networks.

To provide compatibility of WDM systems with existing networks, it is desirable to convert a signal from a received transmission wavelength from a customer to a specific channel wavelength within the WDM system. This is particularly true in WDM systems employing many channels, often referred to as "dense" WDM, where channel spacings are on the order of one nanometer or less. In assignee's prior patent and patent application, U.S. Pat. No. 5,504,609 and Ser. No. 08/624,269, incorporated by reference above, a series of optical remodulators are used to take input signals from various optical transmitters and output the information onto optical channels within the channel plan of a WDM optical system. These optical systems typically employ one-to-one correspondence between an optical channel input to an optical remodulator and an output channel produced by the optical remodulator. However, when the optical transmitters providing the source signals have substantially different data rates from the optical channels used in a WDM system, it may be desirable to have other than one-to-one correspondence between the input and output optical signals. Further, it may be desirable to alter the bit rate of an incident optical signal to a rate best suited for propagation within a transmission line of a WDM optical system.

Thus, there is a need in the art for improved WDM optical communication systems which can receive incoming optical transmission signals of various data rates and place the information from the transmission signals onto one or more optical channels within a WDM system.

SUMMARY OF THE INVENTION

The present invention provides improved compatibility between optical transmitters of various data rates and WDM optical communication systems. In the present invention, optical remodulators are configured to receive an optical signal, separate the information from that optical signal into N information streams (where N is a whole number greater than or equal to 2), and place the information onto N optical channels within the channel plan of a WDM optical system. Alternatively, the present invention provides optical remodulators configured to receive N optical signals, combine the information from the N optical signals, and place the information onto a single output optical channel having a wavelength within the channel plan of a WDM optical system.

More particularly, the present invention provides a wavelength division multiplexed optical communication system compatible with optical transmitters producing optical signals with bit rates higher than the bit rates of the optical channels within the WDM optical system. The WDM optical system includes a first set of one or more optical transmitters, each optical transmitter producing an information-bearing optical signal at a first wavelength. A first set of one or more remodulators optically communicates with each of the optical transmitters. The remodulators place information from each of the information-bearing optical signals of the first set of optical transmitters onto optical channels in the wavelength division multiplexed optical communication system.

Each of the remodulators comprises an optical-to-electrical conversion element for receiving a transmitter information-bearing optical signal and outputting an electrical signal corresponding to information from the transmitter information-bearing optical signal. Means are provided for receiving the electrical signal output by optical-to-electrical conversion element and for separating the received signal into N electrical signals, where N is a whole number greater than or equal to 2. N remodulator lasers emit continuous wave optical carrier signals, the wavelength of each of the optical carrier signal being the wavelength of an optical channel in the wavelength division multiplexed optical communication system. The N electrical signals are routed to optical signal generators each of which creates an information-bearing optical signal corresponding to an optical channel in the wavelength division optical communication system. An optical combiner optically communicates with each of the optical channels produced by the remodulators, the optical combining element combining the remodulator optical channels to form a multiplexed optical signal output to an optical waveguide.

At the receive end of the WDM optical system, a plurality of optical selectors are configured to select one or more optical channels in the wavelength division multiplexed optical communication system. The selected optical channels are routed to a plurality of optical receivers optically communicating with the optical selectors.

In an embodiment in which the bit rates of the optical transmitter signals are less that the bit rates of the WDM optical channels, N optical transmitter signals are routed to a remodulator. The remodulator includes N optical-to-electrical conversion elements which communicate with an electrical multiplexer to combine the information from the N electrical signals output by the optical-to-electrical conversion elements. The output from the electrical multiplexer is used to create the information-bearing optical channel in the WDM system.

DETAILED DESCRIPTION

Figure 1:
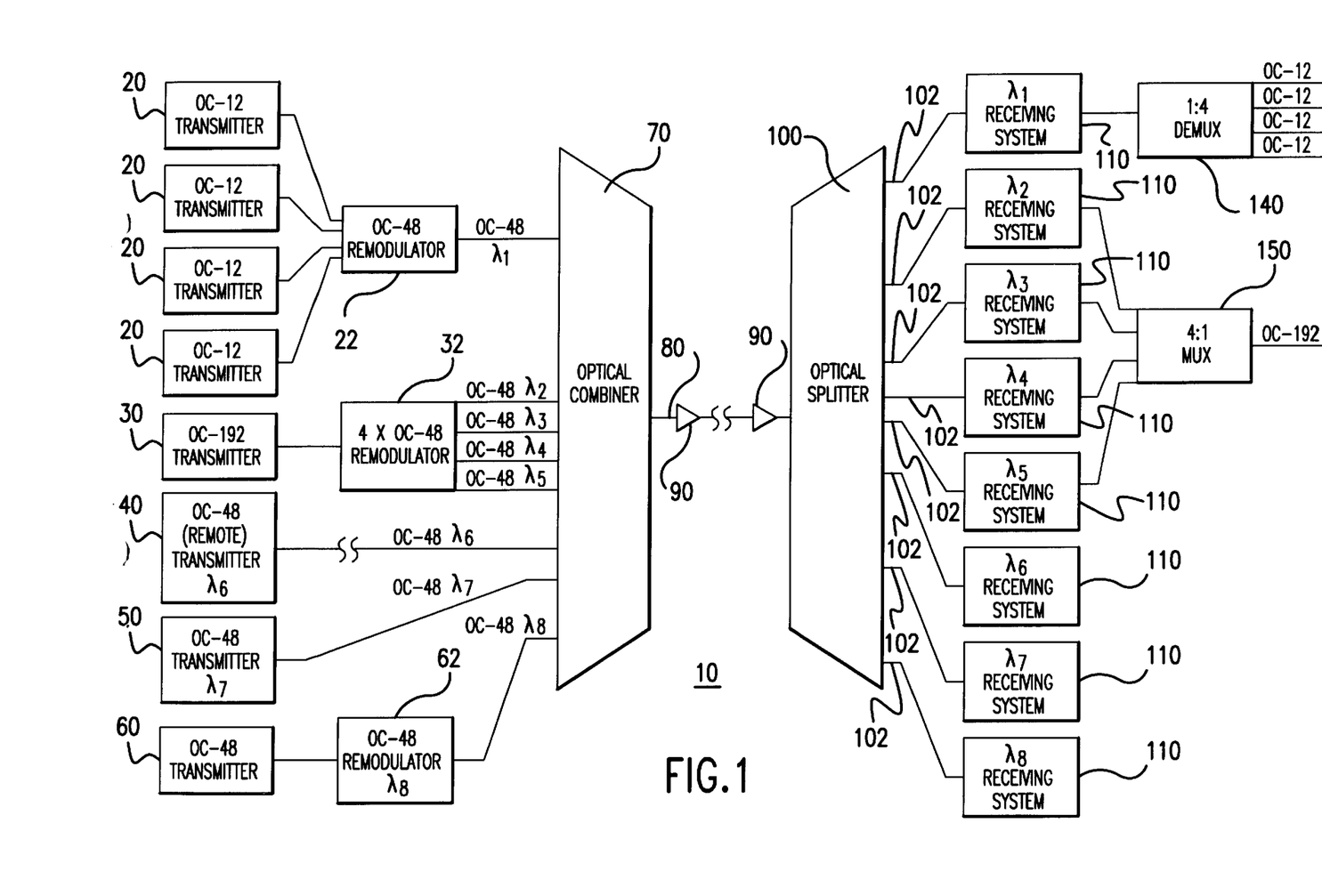
FIG. 1 schematically depicts an optical communication system according to the present invention.

Turning to the drawings in detail in which like reference numerals indicate the same or similar elements in each of the several views, FIG. 1 depicts an optical communication system 10 according to an embodiment of the present invention. Optical communication system 10 takes optical transmission signals from diverse optical transmitters and other optical signal sources and maps the signal sources onto a wavelength division optical communication system, i.e., a communication system in which individual optical signals correspond to optical channels within a wavelength division multiplexed optical signal carried on an optical waveguide. In the exemplary embodiment of FIG. 1, the WDM optical communication carries a multiplexed optical communication signal comprised of 8 optical channels operating at OC-48 (2.5 Mb/s). Although a WDM optical signal can be comprised of individual channels of different data rates, the overall operating efficiency of the system is improved when each optical channel is at the same data rate.

In the optical system of FIG. 1, a variety of optical signal generators are used to provide the sources which will be carried by the optical channels within the WDM optical system. As seen in the FIG., four OC-12 transmitters 20 provide the information carried by OC-48 optical channel $\lambda_1$. A single OC-192 optical transmitter 30 provides the information carried by four OC-48 optical channels $\lambda_2$, $\lambda_3$, $\lambda_4$, $\lambda_5$. A remote optical transmitter 40, which may, for example, be a remodulator from another optical system or form a different portion of the same optical system, directly provides the optical channel having wavelength $\lambda_6$. A local optical transmitter 50 directly outputs optical channel $\lambda_7$. Optical transmitter 60 outputs an OC-48 optical signal having a wavelength other than a wavelength within the channel plan of the optical system and is converted to optical channel $\lambda_8$ through single channel remodulator 62.

Optical transmitters 20, 30, 40, 50, and 60 generally includes a laser, such as a DFB semiconductor laser, and a modulator for creation of an information-bearing optical signal. Because some of the transmitters form part of an existing optical system, a wide variety of transmitters emitting in a broad range of wavelengths can be accommodated in the optical communication system of the present invention, thus ensuring compatibility with currently-deployed transmission equipment. Typical transmitters emit wavelengths ranging from about 1300 to 1600 nm. Transmitters in current optical communication systems and various optical modulation techniques employed therein are described in Gowar, *Optical Communication Systems*, incorporated by reference above. Optical transmitters suitable for use in the present invention are commercially available from NEC, Fujitsu, Alcatel, and Nortel.

Optical communication system 10 includes remodulators 22, 32, and 62 for receiving the transmitted information-bearing optical signal(s) the optical transmitters and transmitting an information-bearing optical signal at a WDM optical system channel wavelength $\lambda_j$. The subscript j ranges from 1 to 8 for the exemplary optical system of FIG. 1 but can also be, for example, 16 or 32 depending upon the capacity needs of the optical route services by the system. The expression "information-bearing optical signal," as used herein, refers to an optical signal which has been coded with information, including, but not limited to, audio signals, video signals, and computer data, generally through modulation. Similarly, the expression "non-information-bearing optical signal," as used herein, relates to a CW optical signal which has not been coded with information, e.g., an optical carrier which has not been modulated. Typically the wavelengths emitted by the remodulators are selected to be within the 1500 nanometer range, the range in which the minimum signal attenuation occurs for silica-based fibers. More particularly, the wavelengths emitted by the remodulators are selected to be in the range from 1530 to 1560 nanometers. However, other wavelength bands may be selected according to overall system requirements.

For an 8-channel wavelength division multiplexed optical communication system, an exemplary channel plan is set forth in Table 1 below. The optical channel plan dictates both the wavelengths of the optical remodulators and the corresponding wavelengths selected by the wavelength selectors in the optical receiving systems.

TABLE 1

| Channel Number | Wavelength (nm) |
| --- | --- |
| 1 | 1557.36 |
| 2 | 1555.75 |
| 3 | 1554.13 |
| 4 | 1552.52 |
| 5 | 1550.92 |
| 6 | 1549.32 |
| 7 | 1547.72 |
| 8 | 1546.12 |

Figure 2:
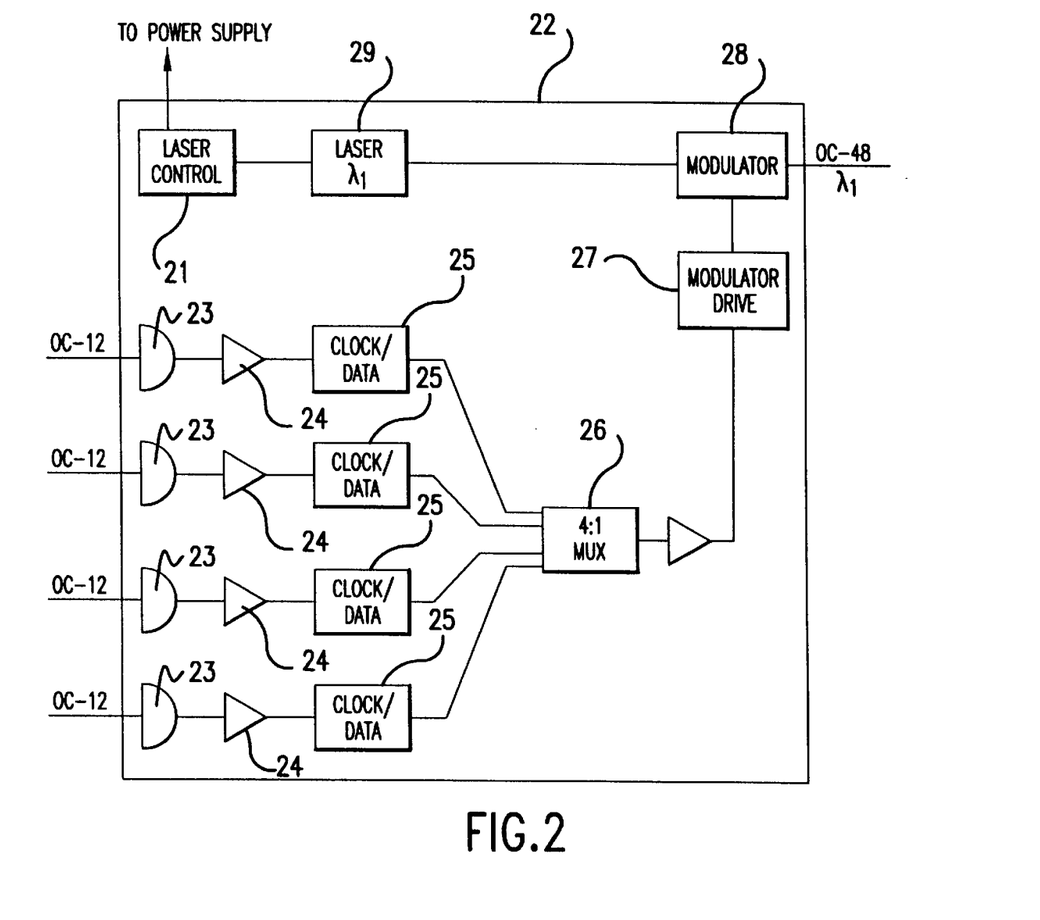
FIG. 2 schematically depicts a remodulator employed in the optical communication system of FIG. 1 which outputs an optical channel from plural input optical signals.
Figure 3:
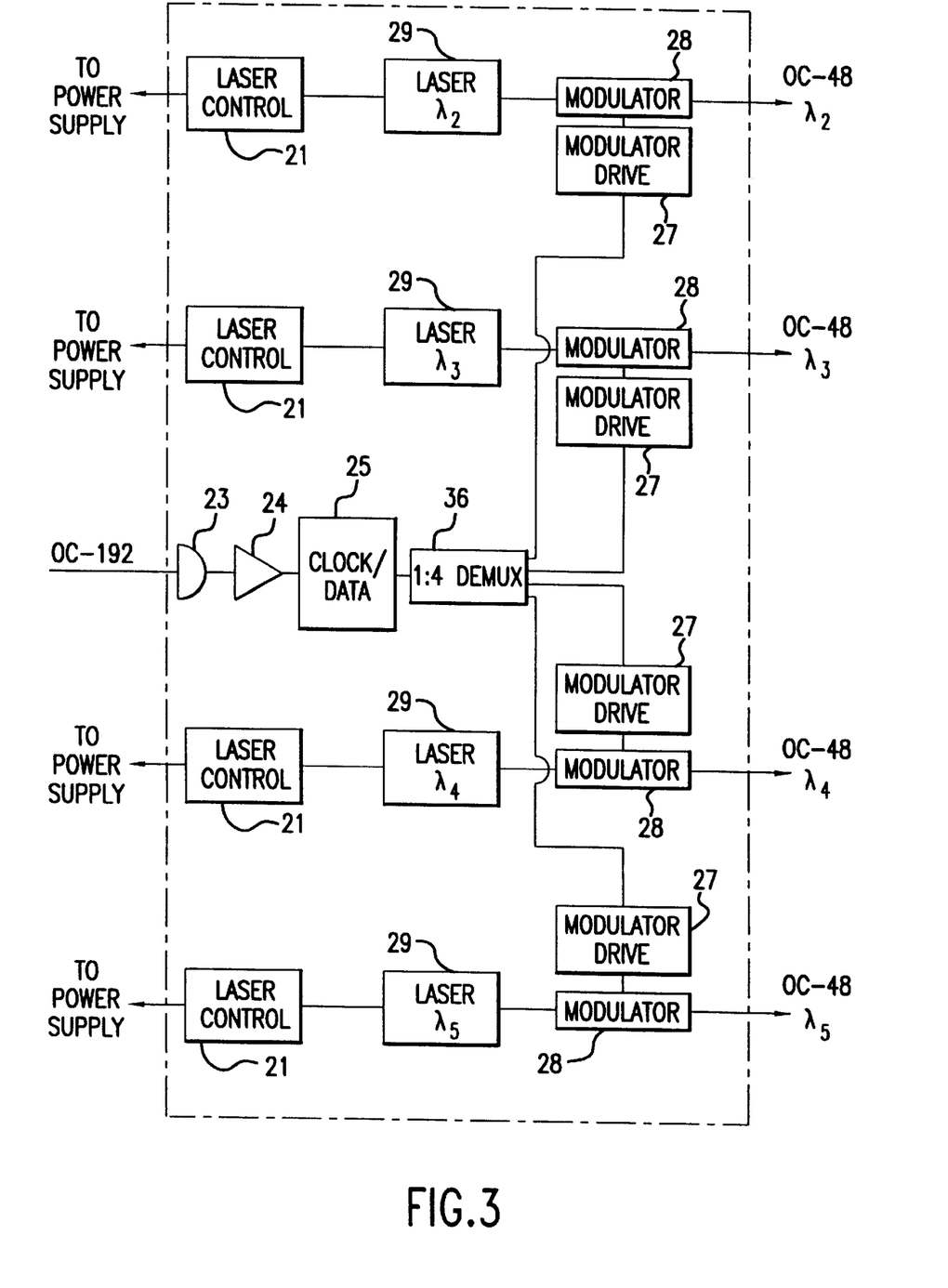
FIG. 3 schematically depicts a remodulator used in the optical communication system of FIG. 1 which outputs plural channels from an input optical signal.

To demonstate the formation of a single optical channel from plural input signals and the formation of plural optical channels from a single input signal, FIGS. 2 and 3 respectively depict optical remodulators 22 and 32. In FIG. 2, remodulator 22 receives four OC-48 optical signals from optical transmitters 20 and outputs a single OC-48 optical channel $\lambda_1$ carrying the information from all four of the input optical signals. The input optical signals are each converted by electro-optical converter 23, typically a photodiode, to an electrical signal. Each electrical signal is amplified by amplifier 24, and routed through clock and data recovery circuit 25.

Each of the four electrical signals generated from the optical signals is routed to an input port of a 4:1 electrical multiplexer 26. Multiplexer 26 interleaves the optical signals into specific time slots, creating a time-division multiplexed electrical signal comprised of the four OC-12 input signals. Electrical multiplexers suitable for use in the remodulators of the present invention include NLG4218, commercially available from NEL. The resultant time division multiplexed electrical signal is used to drive modulator 28 through modulator driver 27.

Remodulator 22 also includes a optical source, such as laser 29, for delivering a non-information-bearing optical carrier signal to the laser output waveguide. In an exemplary embodiment, laser 29 is a DFB semiconductor diode laser, generally comprising one or more III–V semiconductor materials, commercially available from a wide variety of suppliers such as Fujitsu, GEC Marconi, and Hewlett-Packard. The laser outputs an optical carrier signal at a particular channel wavelength, $\lambda_1$, the wavelength corresponding to a demultiplexer wavelength included in the receiving system. Laser control 21 provides the required laser bias current as well as thermal control of the laser. Using thermal control, in conjunction with a laser wavelength reference such as a Bragg grating, the precise operating wavelength of the laser is maintained, typically to within a one angstrom bandwidth.

Modulator 28 is typically selected from modulators which act on an optical carrier emitted from a continuous wave (CW) optical source, such as a laser. Such modulators can be packaged with the optical source or packaged separately from the optical source. An exemplary modulator for use as modulator 36 is a Mach-Zehnder interferometric modulator which provides high-speed intensity modulation of optical carriers. Details of electro-optic modulators are described in Becker, "Broad-Band Guided Wave Electrooptic Modulators," *IEEE Journal of Quantum Electronics,* Vol. QE-20, No. 7, July, 1984, pp. 723–727, the disclosure of which is incorporated by reference herein. Mach-Zehnder interferometers suitable for use in electro-optic modulator 28 are commercially available from UTP and IOC.

Alternatively, the modulator employed in the remodulators of the present invention can be selected from electro-absorption modulators. Electro-absorption modulators function by changing the bandgap of the modulating material to impart information to the optical carrier signal. Exemplary electro-absorption modulators are described in Wood, "Multiple Quantum Well (MQW) Waveguide Modulators," *Journal of Lightwave Technology,* Vol. 6, No. 6, June, 1988, pp. 743–757, the disclosure of which is incorporated by reference herein.

For certain applications it may be economically desirable to use directly-modulated lasers (e.g., short-reach applications which can tolerate the chirp associated with directly-modulated lasers). For such applications the electrical signal output by multiplexer 26 would be input to the laser itself, e.g., through the laser driver.

To demonstrate the formation of a plural optical channels from a single input signal FIG. 3 schematically depicts remodulator 32. Remodulator 32 receives one OC-192 optical signal from optical transmitter 30 and outputs four OC-48 optical channels $\lambda_2$, $\lambda_3$, $\lambda_4$, and $\lambda_5$ carrying the information from the input optical signal. The input OC-192 optical signal is converted by electro-optical converter 23, amplified by amplifier 24, and routed through clock and data recovery circuit 25, all of which are substantially similar to those depicted in FIG. 2.

The resultant electrical signals generated from the optical signals is routed to an input port of a 1:4 electrical demultiplexer 36. Demultiplexer 36 separates the optical signals into specific time slots, creating four electrical signals carrying the information from the OC-192 input signal. Electrical demultiplexers suitable for use in the remodulators of the present invention include NLG4219, commercially available from NEL. Each of the electrical signals created by the demultiplexer is used to drive modulator 28 through modulator driver 27, as in the remodulators of FIG. 2. Remodulator 22 also includes laser 29 and laser control 21, as in the remodulator of FIG. 2. The alternate modulation techniques of discussed in conjunction with FIG. 2 are similarly applicable in this embodiment.

As stated previously, optical transmitters 40 and 50 produce optical signals which are already at wavelengths within the optical channel plan of the WDM optical system and therefore do not require remodulators before entering optical system 10. Optical transmitters 40 and 50 are commercially available from a variety of suppliers, including the OCT-204 series of optical transmitters from Alcatel, the HT2H-LR1H optical transmitters from Fujitsu, and the ITS-2400 optical transmitters from NEC. In the case of remote optical transmitter 40, the transmitter may be part of another optical system or part of an add-drop system (in which case it represents a channel the was dropped from another system). Optical transmitter 60, which produces a wavelength not included in the WDM system channel plan but an optical signal at the same OC-48 data rate, is routed through remodulator 62. Optical remodulator 62 is selected from the optical remodulators disclosed in U.S. Pat. No. 5,504,609 and U.S. patent application Ser. Nos. 08/624,269, filed Mar. 29, 1996 and 08/668,746, filed Jun. 24, 1996 (Attorney Docket Number 115mab) the disclosures of which are incorporated by reference.

Each optical channel, whether produced by a remodulator or optical transmitter, is routed to optical combiner 70 for conveyance to optical waveguide 80. Optical combiner 70 is selected from any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from Corning, Inc., Corning, N.Y., 1×N wideband single mode splitters available from IOT Integrierte Optik GmbH, Waghausel-Kirrlach, Germany, and fused fiber combiners available from Gould, Inc., Millersville, Md. The combination of channels forms a multiplexed optical signal which is output to waveguide 80. Optical waveguide 80 is typically a single-mode optical fiber such as SMF-28, available from Corning, and TRUEWAVE, available from AT&T Corp./Lucent Technologies, and is the principal transmission medium for the optical communication system. However, any optical waveguide which is capable of transporting multiple optical wavelengths can be employed as waveguide 80 in optical system 10.

Optionally interposed along optical waveguide 80 are one or more optical amplifiers 90. Optical amplifiers 90 are selected from any device which directly increases the strength of plural optical signals without the need for optical-to-electrical conversion. In general, optical amplifiers 90 are selected from optical waveguides doped with rare earth ions such as erbium, neodymium, praseodymium, ytterbium, or mixtures thereof. Optical amplifiers, their materials, and their operation are further described in Gowar, Ed. *Optical Communication Systems,* incorporated by reference above and in Desurvire, *Erbium-Doped Fiber Amplifiers,* (John Wiley & Sons, Inc., NY), c. 1994, and Bjarklev, *Optical Fiber Amplifiers: Design and System Applications,* (Artech House, Norwood, Mass.) c. 1993 the disclosures of which are incorporated by reference herein. An exemplary optical amplifier configuration is disclosed in U.S. patent application Ser. No. 08/554,976, the disclosure of which is incorporated by reference herein. Alternatively, other optical amplifiers, such as semiconductor optical amplifiers, may be used along transmission line 80.

Following transmission and amplification of the multiplexed optical signals along waveguide 80, each channel must be demultiplexed and routed to the receiver designated for the particular $\lambda_j$ channel. The multiplexed signal is input to optical splitter 100 which places a portion of the multiplexed signal onto plural output paths 102. Each output path 102 optically communicates with a receiving system 110. Optical splitter 100 is selected from any optical device which can divide an input optical signal and place it onto plural output paths. Exemplary splitters include passive optical components such as those components described for use as optical combiner 70.

Figure 4:
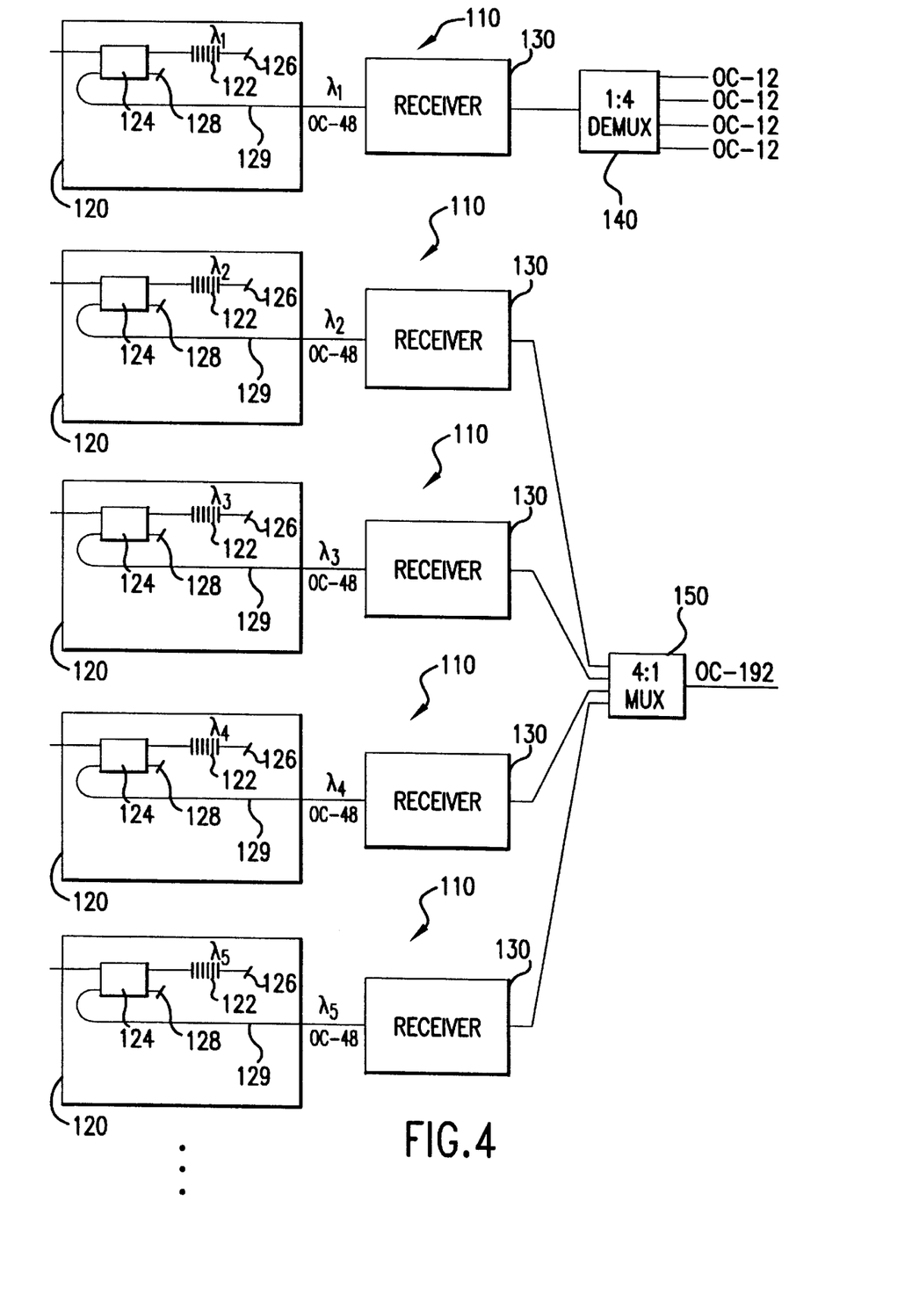
FIG. 4 schematically depicts optical receiving systems employed in the optical communication system of FIG. 1.

FIG. 4 schematically depicts an exemplary receiving systems 110 for use in optical communication system 10. Although the receiving systems for channels 1–5 only are depicted, the receiving systems for channels 5–8 are substantially similar and are not shown for clarity of presentation. Receiving system 110 includes a wavelength selector 120 for selecting the particular channel, $\lambda_j$, from the multiplexed signal and receiver 130. To perform the channel selection, the multiplexed signal is routed to wavelength selector optical filter 122 through splitter 124. The optical filter passes optical signals having wavelengths other than the channel wavelength $\lambda_j$ to be sent to the receiver. These non-selected channels pass through low reflectivity port 126 and exit the optical communication system. The low reflectivity port 126 can be performed through an angled fiber cut termination into a light-absorbing medium although any low reflectivity waveguide termination technique may be employed. The channel wavelength $\lambda_1$ is reflected by optical filter 122 to receiver 130 through splitter 124. The unused optical signals exit splitter 124 through low-reflectivity port 128. In an exemplary embodiment, the optical filter comprises a Bragg grating member which reflects the channel wavelength $\lambda_j$ and transmits all other wavelengths. Consequently, the channel wavelengths emitted by the remodulators are matched to the reflection wavelengths of the Bragg gratings incorporated in the receiving systems. Preferably, the Bragg grating comprises a series of photo-induced refractive index perturbations in an optical fiber which causes the reflection of optical signals within a selected wavelength band. Bragg gratings suitable for use in the optical system of the present invention are described in Morey et al., "Photoinduced Bragg Gratings in Optical Fibers," *Optics and Photonics News,* February 1994, pp. 8–14, the disclosure of which is incorporated by reference herein.

The reception channel wavelength $\lambda_j$ is input to receiver 130 through splitter waveguide 129. Optionally, the signal may be optically amplified before it reaches the receiver. Receiver 130 detects the optical signal and converts it to an electrical signal, typically through the use of a photodiode device. Various optical receivers suitable for use in optical system 10 are described in Gowar, *Optical Communication Systems,* discussed above and are commercially available from Nortel, NEC, Alcatel, and Lucent Technologies.

To recreate four OC-12 optical signals from the OC-48 $\lambda_1$, optical channel, the electrical signal from receiver 130 is routed to 1:4 electrical demultiplexer 140. Demultiplexer 140 creates four OC-12 signals from the interleaved time slots of the OC-48 signal. Similarly, the OC-192 optical signal is created by combining the four OC-48 optical channels, $\lambda_2$–$\lambda_5$, in electrical multiplexer 150, placing a portion of each of the OC-48 signals into the appropriate time slot as in the original OC-192 signal.

While the foregoing invention has been described in terms of the embodiments discussed above, numerous variations are possible. For example, when plural optical channels are created by a remodulator from a single input signal, those channels may be routed to separate optical systems, instead of to the same optical system as depicted above. The remodulators of the present invention may further include error reduction techniques such as forward error detection, as described in the Ser. No. 08/668,746 (Attorney Docket Number 115mab) patent application, incorporated by reference above. Additional overhead bits may be added when plural optical channels are created from a single optical signal or when a single optical channel is created from plural optical signals. Accordingly, modifications and changes such as those suggested above, but not limited thereto, are considered to be within the scope of following claims.

What is claimed is:

1. A wavelength division multiplexed optical communication system for transmitting a plurality of optical communication channels on an optical waveguide, each optical communication channel having a distinct channel wavelength, the optical communication system comprising:

a first set of one or more optical transmitters, each optical transmitter configured to transmit an information-bearing optical signal at a particular wavelength;

one or more remodulators optically communicating with the optical transmitters in the first set of optical transmitters, the remodulators placing information from the information-bearing optical signals of the first set of optical transmitters onto optical channels in the wavelength division multiplexed optical communication system, each of the remodulators comprising:

an optical-to-electrical conversion element for receiving a transmitter information-bearing optical signal and outputting an electrical signal corresponding to information from the transmitter optical signal;

means for receiving the electrical signal output by optical-to-electrical conversion element and separating the received signal into N electrical signals, where N is a whole number greater than or equal to 2;

N means for creating optical signals including the information from each of the N electrical signals, each of the N optical signal-creating means communicating with the means for separating the received signal into N electrical signals, the N optical signal-creating means each outputting an information-bearing optical signal corresponding to an optical channel in the wavelength division optical communication system;

an optical waveguide;

an optical combining element optically communicating with the optical channels produced by the remodulators, the optical combining element combining the remodulator optical channels to form a multiplexed optical signal output to the optical waveguide;

a plurality of optical selectors optically communicating with the optical waveguide, each optical selector configured to select one or more optical channels in the wavelength division multiplexed optical communication system; and a plurality of optical receivers optically communicating with the optical selectors.

2. A wavelength division multiplexed optical communication system as recited in claim 1 wherein each of the N means for creating optical signals includes a laser and a modulator.

3. A wavelength division multiplexed optical communication system as recited in claim 2 wherein the modulator is an electro-optic modulator.

4. A wavelength division multiplexed optical communication system as recited in claim 3 wherein the electro-optic modulator includes a Mach-Zehnder interferometer.

5. A wavelength division multiplexed optical communication system as recited in claim 3 wherein the modulator is an electro-absorption modulator.

6. A wavelength division multiplexed optical communication system comprising:
   an optical transmitter which produces a modulated optical signal;
   an optical remodulator optically communicating with the optical transmitter, for placing information from the modulated optical signal of the optical transmitter onto plural optical channels in the wavelength division multiplexed optical communication system, the remodulator comprising:
      an optical-to-electrical conversion element for receiving the transmitter modulated optical signal and outputting an electrical signal corresponding to information from the transmitter optical signal;
      an electrical demultiplexer for receiving the electrical signal output by optical-to-electrical conversion element and separating the received signal into N electrical signals, where N is a whole number greater than or equal to 2,
   N remodulator lasers for emitting continuous wave optical carrier signals, the wavelength of each of the optical carrier signal being the wavelength of an optical channel in the wavelength division multiplexed optical communication system;
      N modulators for modulating each of the optical carrier signals emitted by the remodulator lasers, each of the N modulators communicating with one of the N electrical signals output from the separating means for imparting the information from the electrical signal to the to the optical signal through the modulator to create an information-bearing optical signal corresponding to an optical channel in the wavelength division optical communication system;
   an optical waveguide;
   an optical combining element optically communicating with the optical channels produced by the remodulators, the optical combining element combining the remodulator optical channels to form a multiplexed optical signal output to the optical waveguide;
   a plurality of optical selectors optically communicating with the optical waveguide, each optical selector configured to select one or more optical channels in the wavelength division multiplexed optical communication system;
   a plurality of optical receivers optically communicating with the optical selectors; and
   an electrical multiplexer for creating a multiplexed electrical signal including the information from each of the optical channels output by the remodulator.

7. An optical communication apparatus, comprising:
   a first photodetector configured to sense a first optical signal having a first data rate, and generate a first electrical signal in response thereto;
   an electrical demultiplexing circuit having an input coupled to said first photodetector and a plurality of outputs, said electrical demultiplexing circuit generating each of a plurality of second electrical signals at a respective one of said plurality of outputs in response to said first electrical signal;
   a plurality of first optical transmitters, each of which being respectively coupled to a respective one of said plurality of outputs of said electrical demultiplexing circuit, said plurality of first optical transmitters generating a plurality of second optical signals, each at a respective one of a plurality of wavelengths and in response to a respective one of said plurality of second electrical signals, at least one of said plurality of second optical signals having a second data rate less than said first data rate;
   a plurality of second photodetectors, each of which being configured to sense a respective one of said plurality of second optical signals, and generate a respective one of a plurality of third electrical signals in response thereto;
   an electrical multiplexing circuit having a plurality of inputs, each of which being coupled to a respective one of said second plurality of photodetectors, and an output supplying a fourth electrical signal in response to said plurality of third electrical signals;
   a second optical transmitter emitting a third optical signal at a third data rate.

8. An optical communication apparatus in accordance with claim 7, further comprising:
   an optical multiplexer coupled to said plurality of first optical transmitters, said optical multiplexer being configured to direct said plurality of second optical signals onto an optical communication path.

9. An optical communication apparatus in accordance with claim 8, wherein said optical communication path comprises an optical waveguide.

10. An optical communication apparatus in accordance with claim 7, wherein said first and third data rates are substantially equal to an OC-192 data rate, and said second data rate is substantially equal to an OC-48 data rate.

11. An optical communication apparatus in accordance with claim 8, further comprising:
   an optical demultiplexer having an input coupled to said optical communication path and a plurality of outputs, each of which being coupled to a respective one of said plurality of second photodetectors, said optical demultiplexer supplying a respective one of said plurality of second optical signals to said second photodetectors via a respective one of said plurality of outputs of said optical demultiplexer.

12. An optical communication apparatus in accordance with claim 11, wherein said optical demultiplexer further comprises:
   an optical splitter having an input coupled to said optical communication path, and a plurality of outputs;
   a plurality of optical selectors, each of which respectively coupled to one of said plurality of outputs of said optical splitter, each of said plurality of optical selectors supplying a corresponding one of said plurality of second optical signals to a respective one of said plurality of second photodetectors.

13. An optical communication apparatus in accordance with claim 7, wherein said third data rate is higher than said second data rate.

* * * * *

US005938309C1

(12) EX PARTE REEXAMINATION CERTIFICATE (5599th)
United States Patent
Taylor (10) Number: US 5,938,309 C1
(45) Certificate Issued: Nov. 7, 2006

(54) BIT-RATE TRANSPARENT WDM OPTICAL COMMUNICATION SYSTEM WITH REMODULATORS

(75) Inventor: Michael G. Taylor, Laurel, MD (US)

(73) Assignee: Ciena Corporation, Linthicum, MD (US)

Reexamination Request:
No. 90/007,241, Oct. 7, 2004

Reexamination Certificate for:
| | |
|---|---|
| Patent No.: | 5,938,309 |
| Issued: | Aug. 17, 1999 |
| Appl. No.: | 08/820,670 |
| Filed: | Mar. 18, 1997 |

(51) Int. Cl.
| | |
|---|---|
| H04J 14/00 | (2006.01) |
| H04J 4/00 | (2006.01) |
| H04J 14/02 | (2006.01) |
| H04B 10/00 | (2006.01) |
| H04B 10/12 | (2006.01) |

(52) U.S. Cl. .............................. 398/79; 398/43; 398/75; 398/175; 398/178; 398/1; 398/91; 375/214
(58) Field of Classification Search .................. 398/43, 398/75, 79, 91, 98, 140, 141, 158, 173, 175, 398/178; 375/211, 214, 215
See application file for complete search history.

(56) References Cited

U.S. PATENT DOCUMENTS

| | | | | |
|---|---|---|---|---|
| 5,467,212 A | | 11/1995 | Huber ......................... | 359/168 |
| 5,487,120 A | | 1/1996 | Choy et al. .................... | 385/26 |
| 5,504,609 A | * | 4/1996 | Alexander et al. ............. | 398/91 |
| 5,581,566 A | * | 12/1996 | St. John et al. .............. | 714/757 |
| 5,710,650 A | * | 1/1998 | Dugan .......................... | 398/91 |

OTHER PUBLICATIONS

1995 article entitled Network Design Consideration of n–Channel WDM Architectures with EDFAs for Central Office Applications.
Defendant's Answer and Counterclaims.
The complete civil docket sheet in Civil Action No. 00–662(JJF).
Defendant's responses to Ciena's Second Set of Interrogatories.
Defendant's responses to Ciena's First Set of Interrogatories.
Defendant's responses to Ciena's Third Set of Interrogatories.
Defendant's Supplemental Responses to Ciena's Interrogatories.
The complete trial transcripts for trial dates Feb. 25, 2003 to Feb. 28, 2003.
Joint Pretrial Order.
Plaintiff's Joint Responses to Defendant's First Set of Interrogatories (Nos. 1–16).
Expert Report of Dr. Paul R. Prucnal.
Rebuttal Expert Report of Martin Pollack.
Expert Report of Martin Pollack.
Defendant Corvis Corporation's Motion for Partial Summary Judgment of Patent Invalidity.
Corvis' Reply Brief in Support of its Motion for Partial Summary Judgment of Patent Invalidity.
The Ciena Plaintiff's Opposition to Corvis' Motion for Summary Judgment of Patent Invalidity.

* cited by examiner

*Primary Examiner*—M. R. Sedighian (57) ABSTRACT

The present invention provides improved compatibility between optical transmitters of various data rates and WDM optical communication systems. In the present invention, optical remodulators are configured to receive an optical signal, separate the information from that optical signal into N information streams (where N is a whole number greater than or equal to 2), and place the information onto N optical channels within the channel plan of a WDM optical system. Alternatively, the present invention provides optical remodulators configured to receive N optical signals, combine the information from the N optical signals, and place the information onto a single output channel having a wavelength within the channel plan of a WDM optical system.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–13 is confirmed.

New claims 14–20 are added and determined to be patentable.

*14. A wavelength division multiplexed optical communication system as set forth in claim 1, wherein:*

*said first set of one or more optical transmitters includes a first optical transmitter for transmitting an optical signal at a first data rate and a second optical transmitter for transmitting an optical signal at a second data rate.*

*15. A wavelength division multiplexed optical communication system as set forth in claim 14, wherein:*

*said first data rate is higher than said second data rate.*

*16. A wavelength division multiplexed optical communication system as set forth in claim 15, wherein:*

*said first data rate is OC-192 and said second data rate is OC-12.*

*17. A wavelength division multiplexed optical communication system as set forth in claim 15, wherein:*

*said first data rate is OC-192 and said second data rate is OC-48.*

*18. A wavelength division multiplexed optical communication system as set forth in claim 6, further comprising:*

*a demultiplexer communicating with an output of one of said plurality of optical receivers for creating a plurality of optical signals each traveling at a data rate less than a data rate of a signal output from said one of said plurality of optical receivers.*

*19. A wavelength division multiplexed optical communication system as set forth in claim 6, wherein:*

*said demultiplexer is an electrical demultiplexer.*

*20. An optical communication apparatus as set forth in claim 7, further comprising:*

*a demultiplexer communicating with an output of one of said plurality of second photodetectors for creating a plurality of optical signals each traveling at a data rate less than a data rate of a signal output from said one of said plurality of second photodetectors.*

* * * * *